United States Patent [19]
Yamazaki et al.

[11] Patent Number: 5,541,491
[45] Date of Patent: Jul. 30, 1996

[54] BATTERY CHARGING APPARATUS

[75] Inventors: Yasuharu Yamazaki, Saitama; Shoichi Nakamura, Tokyo, both of Japan

[73] Assignee: Sony Corporation, Japan

[21] Appl. No.: 286,988

[22] Filed: Aug. 8, 1994

Related U.S. Application Data

[63] Continuation of Ser. No. 91,965, Jul. 16, 1993, abandoned.

[30] Foreign Application Priority Data

Jul. 21, 1992 [JP] Japan .................................. 4-215485
Mar. 29, 1993 [JP] Japan .................................. 5-093678

[51] Int. Cl.$^6$ .................................................. H01M 10/46
[52] U.S. Cl. .............................. 320/22; 320/24; 320/21
[58] Field of Search .................................. 320/21, 22, 23, 320/24, 31, 32, 39, 40, 43, 44

[56] References Cited

U.S. PATENT DOCUMENTS

| | | | |
|---|---|---|---|
| 3,919,618 | 11/1975 | Coleman et al. | 320/23 X |
| 3,944,904 | 3/1976 | Hase | 320/23 |
| 3,963,976 | 6/1976 | Clark | 320/21 |
| 4,035,709 | 7/1977 | Seider et al. | 320/23 |
| 4,607,208 | 8/1986 | Vreeland | 320/21 |
| 4,661,758 | 4/1987 | Whittaker | 320/21 |
| 4,670,703 | 6/1987 | Williams | 320/22 |
| 4,710,694 | 12/1987 | Sutphin et al. | 320/21 |
| 4,727,306 | 2/1988 | Misak et al. | 320/22 X |
| 4,862,013 | 8/1989 | Konopka | 320/21 X |
| 4,977,353 | 12/1990 | Helal et al. | 315/130 |
| 4,992,720 | 2/1991 | Hata | 320/23 |
| 5,225,763 | 7/1993 | Krohn et al. | 320/23 |
| 5,237,259 | 8/1993 | Sanpei | 320/23 |
| 5,241,258 | 8/1993 | Cheon | 320/23 |
| 5,291,116 | 3/1994 | Feldstein | 320/4 |
| 5,350,996 | 9/1994 | Tauchi | 320/22 |

FOREIGN PATENT DOCUMENTS

| | | |
|---|---|---|
| 314155 | 3/1989 | European Pat. Off. . |
| 473514 | 4/1992 | European Pat. Off. . |
| 2274156 | 1/1976 | France . |
| 4027146 | 3/1992 | Germany . |
| 8805222 | 7/1988 | WIPO . |

OTHER PUBLICATIONS

EDN ELECTRICAL DESIGN NEWS; vol. 37, No. 2, 20 Jan. 1992 Newton Massachusetts US pp. 87–88 SWAGER 'Controller quickly charges NiCd batteries using current pulses and time derivatives'.

*Primary Examiner*—Peter S. Wong
*Assistant Examiner*—Patrick B. Law
*Attorney, Agent, or Firm*—Ronald P. Kananen

[57] ABSTRACT

A battery charging apparatus for charging a chargeable battery is disclosed. The apparatus comprises: a dc power source for generating a charging current; current control means connected between the dc power source and a chargeable battery to be charged; charging controller means connected to the current control means for controlling a flow of the charging current from the dc power source to the chargeable battery; and charging condition detecting means for detecting charging condition of the chargeable battery during charging operation. The charging controller means supplies control pulse to the current control means.

16 Claims, 5 Drawing Sheets

BATTERY CHARGING APPARATUS

This application is a continuation of application Ser. No. 08/091,965 filed Jul. 16, 1993 now abandoned.

BACKGROUND OF THE INVENTION

1. Field of the Invention

This invention relates to a battery charging apparatus for a chargeable battery which is suitable for a video camera and the like.

2. Description of the Prior Art

For example, existing portable video cameras use a chargeable battery a nickel-cadmium type or a nickel-hydrogen type as an operating power source. The capacity of such a chargeable battery is about 600 mA/h and 1000 mA/h. A charging of the chargeable battery is performed by a dc power source which is obtained by rectifying an ac power source. In such charging, a constant current as shown in FIG. 1A is supplied to the chargeable battery. In addition, in order to make up for a decrease of charge due to self-discharge, even after a completion of charging, a charging current as shown in FIG. 1B is supplied to the chargeable battery.

According to the charging method mentioned above, even after a completion of charging, the same charging current as that in charging is supplied to the chargeable battery. In the meantime, since the amount of self-discharge is not great, it is not necessary to charge with the current as shown in FIG. 1B. Therefore, charging is performed by a current as shown in FIGS. 2A and 2B. That is, in a quick charging situation, a relatively large constant current as shown in FIG. 2A is supplied to the chargeable battery. After a completion of charging, in order to make up for the self-discharged charge, a relatively small constant current (refer to FIG. 2B) as compared with that in the quick charging is supplied to the chargeable battery.

FIG. 3 shows a circuit block diagram of a battery charging apparatus to supply the chargeable battery with such a current as shown in FIGS. 2A and 2B. In addition, charging to the chargeable battery is made either by quick charging for the short charging time or by a normal charging for the normal charging time. For example, if charging is normal, then a control signal supplied from a control block 101 activates a charging block 102 to flow a current I, for the normal charging to charge the chargeable battery 103.

In addition, whether the chargeable battery 103 is fully charged or not is detected in a full charging detecting block 104. If the full-charge detecting block 104 detects that the chargeable battery 103 has already been fully charged, a detection signal DS is supplied from the full-charge detecting block 104 to the control block 101. A control signal for controlling the amount of the current is supplied from the control block 101 to the charging block 102. The current to be supplied to the chargeable battery 103 becomes a relatively small constant current as shown in FIG. 2B.

If charging by quick charging, then a control signal output from the control block 101 activates a charging block 105 to flow a current I2 for a quick charging to charge the chargeable battery 103. In the same way as mentioned above, if the full-charge detecting block 104 detects that the chargeable battery 103 is fully charged, then a relatively small constant current is supplied to the chargeable battery 103.

Nevertheless, even if such a circuit configuration has been achieved, the chargeable battery is forced to be charged at all times.

As mentioned above, if the chargeable battery is charged at all times, there occurs an over-charge and the cell characteristics of the battery could be degraded. Moreover, if a small charging current is supplied at all times after the full-charge, then the drop in charge efficiency could result with no appropriate charging.

In addition, a battery charging apparatus having a plurality of charging modes such as a quick charging mode, a normal charging mode, or the like, requires circuits equal in number to the number of charging modes. Therefore, the number of parts will also increase to prevent the battery charging apparatus from being miniaturized. Moreover, if an integrated circuit (IC) is adopted in the control block, then pins of the IC are used for the quick charging and normal charging circuits. However, there is a limit to the number of the pins of the IC. For example, pins reserved for other signal lines could be used for the charging circuits to restrict the function of the IC itself.

OBJECTS AND SUMMARY OF THE INVENTION

It is therefore an object of the invention to provide a battery charging apparatus, wherein charging can be made without degrading the battery characteristics even if a chargeable battery has been connected to the battery charging apparatus for a long period, and wherein the battery capacity can be maintained for a long period.

It is another object of the invention to provide a battery charging apparatus, wherein a plurality of circuits for different charging modes can be integrated so that the circuit scale can be reduced.

According to an aspect of the invention, there is provided a battery charging apparatus for charging a chargeable battery, comprising:

a dc power source for generating a charging current;

current control means connected between the dc power source and a chargeable battery to be charged;

charging controller means connected to the current control means for controlling a flow of the charging current from the dc power source to the chargeable battery; and charging condition detecting means for detecting a charging condition of the chargeable battery during a charging operation;

wherein the charging controller means supplies a control pulse to the current control means.

Charging to cope with an over-charge or a self-discharge occurs at a periodic pulse current having a constant amplitude. This results in charging without degrading the battery characteristics. In addition, switching between charging modes is performed by a charging controller. Thereby, different charging circuits are integrated so that the size of the apparatus can be reduced.

The above, and other, objects, features and advantage of the present invention will become readily apparent from the following detailed description thereof which is to be read in connection with the accompanying drawings.

3

Figure 1A:
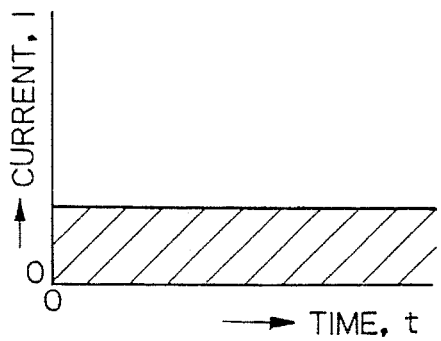
FIGS. 1A and 1B are schematic diagrams to show an example of a charging current in the prior art.
Figure 1B:
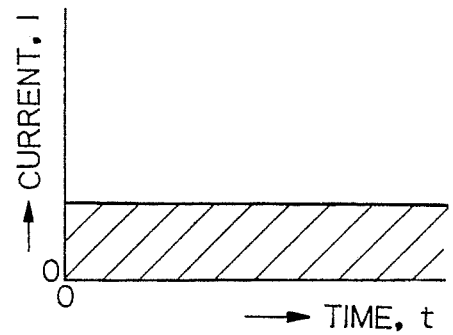
Figure 2A:
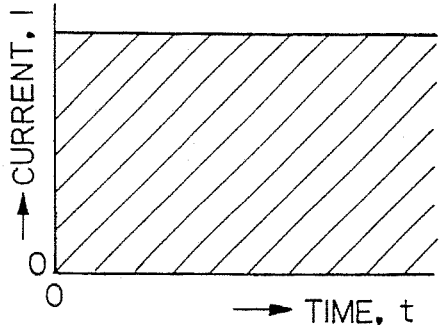
FIGS. 2A and 2B are schematic diagrams to show another example of a charging current in the prior art.
Figure 2B:
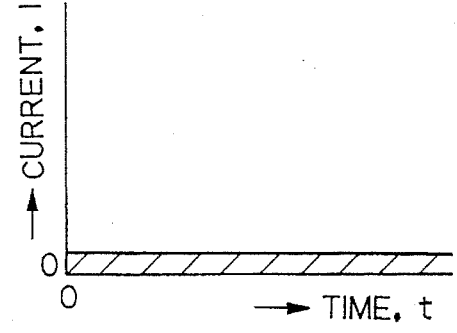
Figure 3:
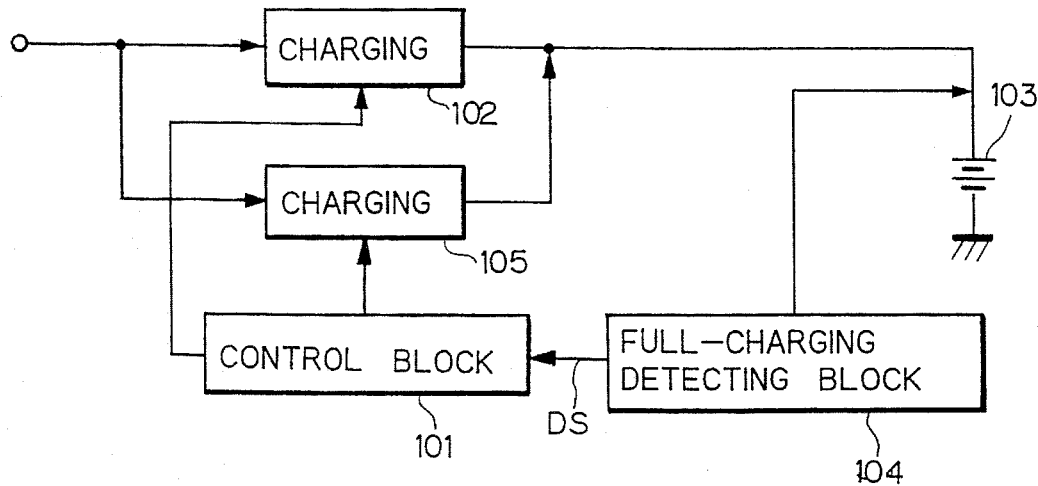
Figure 4:
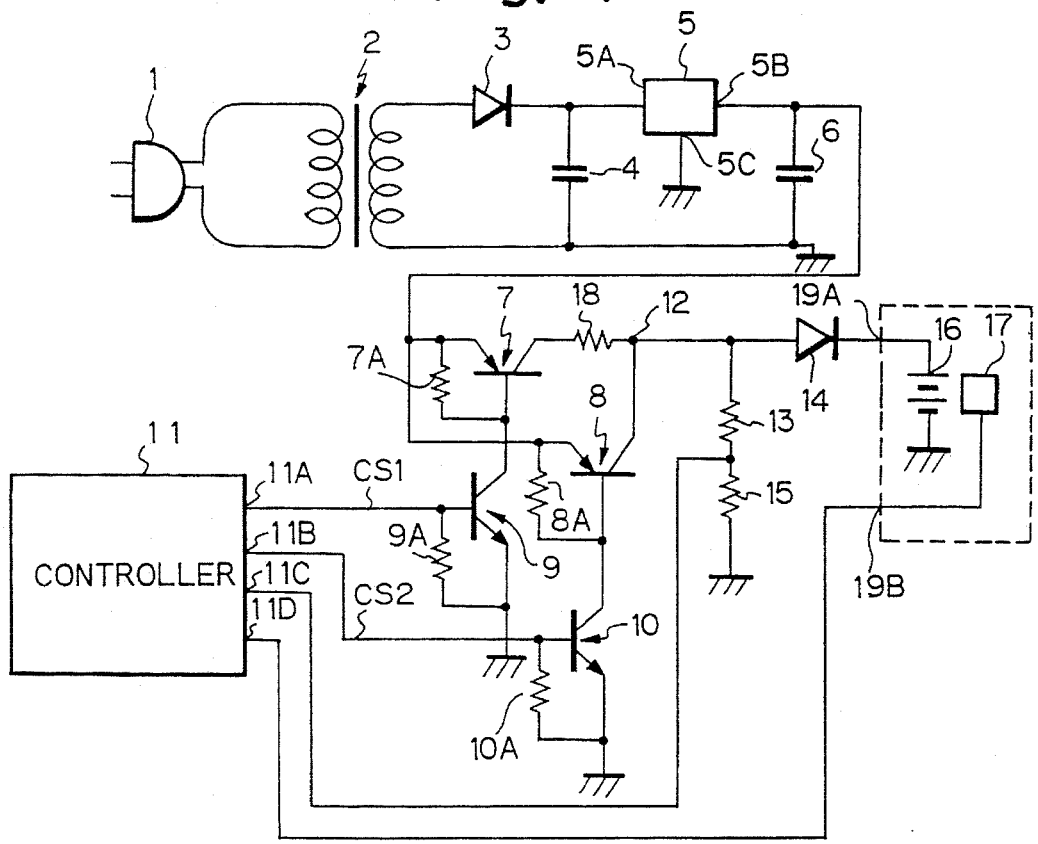
Figure 5:
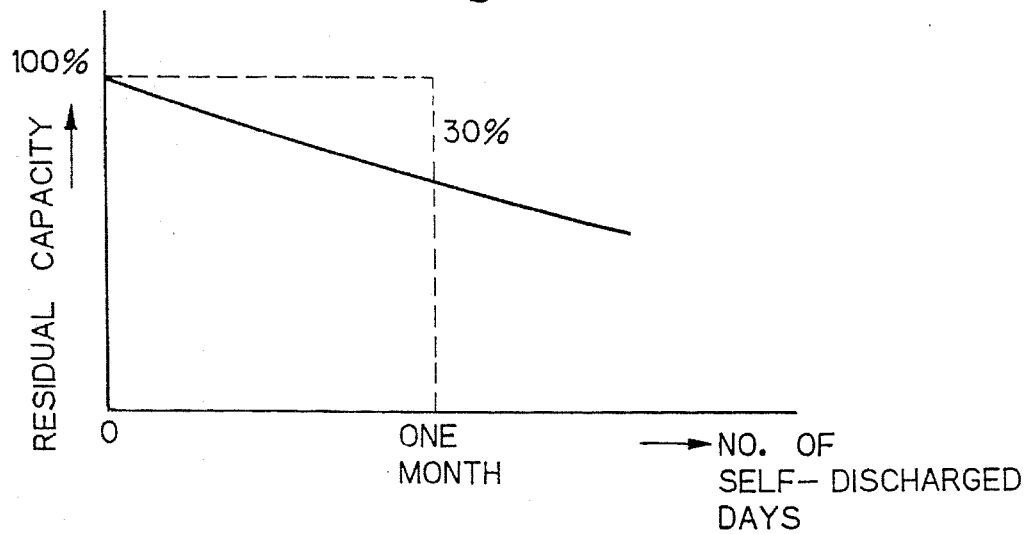
Figure 6:
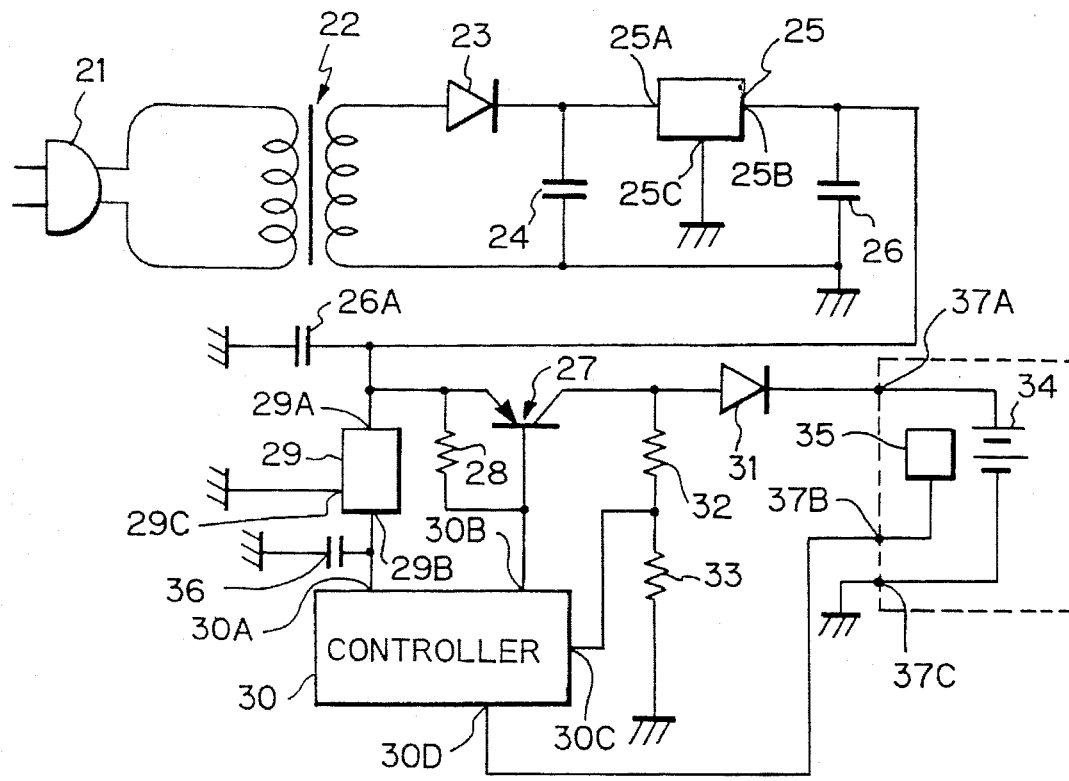
Figure 7A:
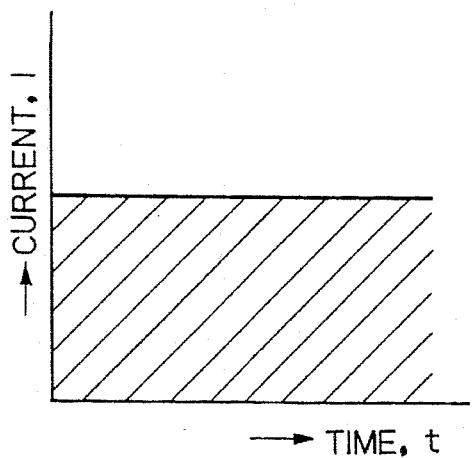
Figure 7B:
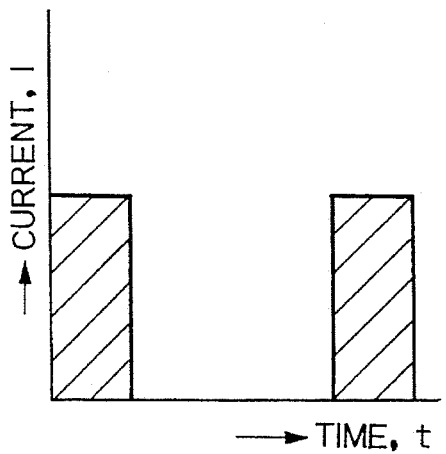
Figure 8:
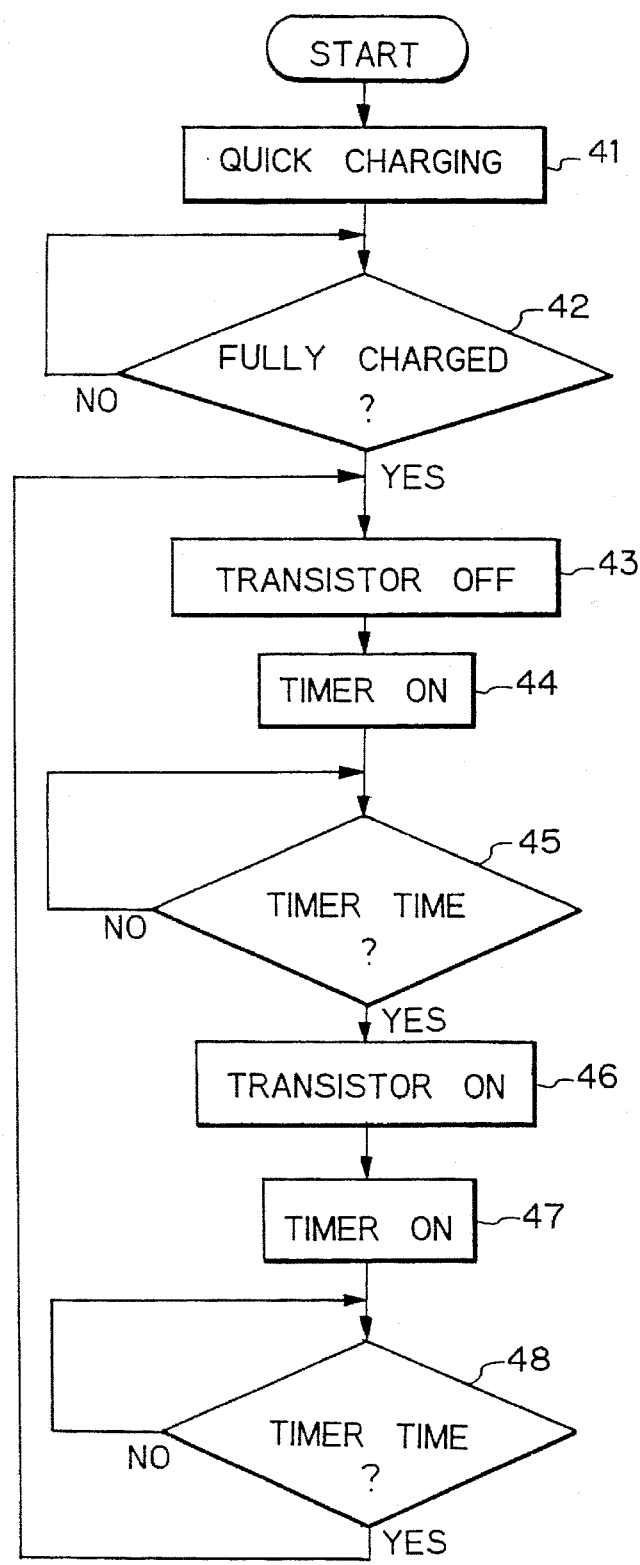
Figure 9:
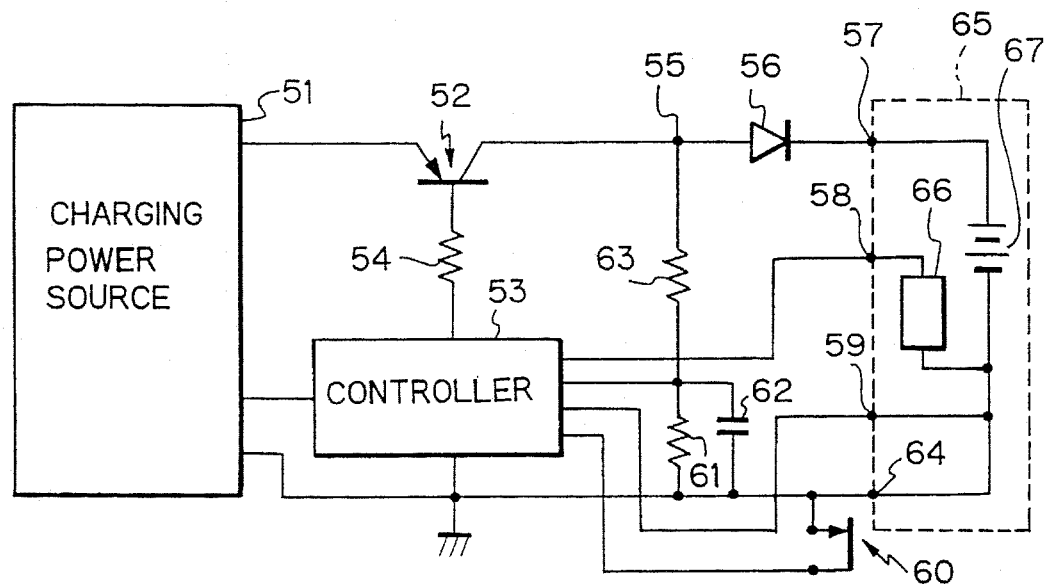
Figure 10:
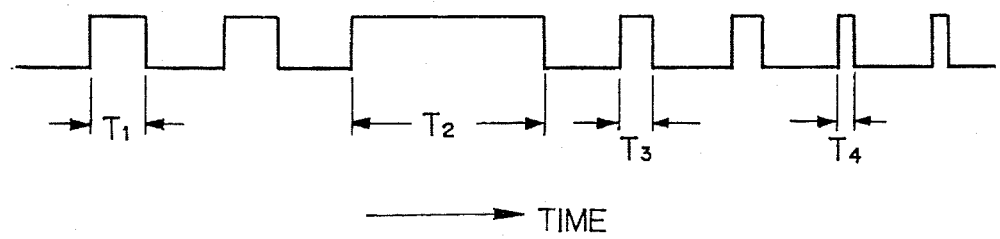

FIG. 3 is a circuit block diagram of an example of the existing battery charging apparatus;

FIG. 4 is a circuit block diagram of a battery charging apparatus according to a first embodiment of the invention;

FIG. 5 is a schematic diagram of an example of the characteristics of the chargeable battery;

FIG. 6 is a circuit block diagram of a battery charging apparatus according to a second embodiment of the invention;

FIGS. 7A and 7B are schematic diagrams of an example of the charging current;

FIG. 8 is a flowchart of an example of the quick charging operation of the charging controller;

FIG. 9 is a circuit block diagram of a battery charging apparatus according to a third embodiment of the invention; and FIG. 10 is a waveform diagram of a charging current in the battery charging apparatus according to the third embodiment.

DETAILED DESCRIPTION OF THE PREFERRED EMBODIMENTS

Embodiments of the invention will now be explained below with reference to the drawings.

FIG. 4 shows a circuit block diagram of a battery charging apparatus according to a first embodiment of the invention. In FIG. 4, an ac plug 1 is connected to the primary winding of a transformer 2. A diode 3 is connected at one end to the secondary winding of the transformer 2. The other end of the diode 3 is connected to one end of a capacitor 4 and a terminal 5A of a dc-dc converter 5. A terminal 5C of the dc-dc converter 5 is grounded, and a terminal 5B is connected to one end of a capacitor 6. The other end of the secondary winding of the transformer 2 is connected to the other end of the capacitor 4 and the other end of the capacitor 6.

In addition, the one end of the capacitor 6 is connected to an emitter of a transistor 7 and an emitter of a transistor 8. A collector of the transistor 7 is connected to a collector of the transistor 8 at a junction point 12 through a resistor 18 for limiting current flow. A base of the transistor 7 is connected to a collector of a transistor 9, and a base of the transistor 8 is connected to a collector of a transistor 10, respectively. A base of the transistor 9 is connected to a terminal 11A of a charging controller 11, and a base of the transistor 10 is connected to a terminal 11B of the charging controller 11, respectively. In addition, both an emitter of the transistor 9 and an emitter of the transistor 10 are grounded. Resistors 7A, 8A, 9A and 10A for bias are respectively connected between each base and emitter of the transistors 7, 8, 9 and 10.

The junction point 12 is connected to one end of a resistor 13 and one end of a diode 14. The other end of the resistor 13 is connected to a terminal 11C of the charging controller 11, and also connected to one end of a resistor 15. The other end of the resistor 15 is grounded. The resistor 13 and resistor 15 are used to detect the voltage of a chargeable battery. That is, a change of a charging voltage ΔV from the time at which a chargeable battery 16 which will be explained later is fully charged to the time at which discharging starts, is detected by the resistors 13 and 15. The other end of the diode 14 is connected to the chargeable battery 16 of a nickel-cadmium type or an nickel-hydrogen type through a terminal 19A. In addition, a battery tempera-

4 ture sensor 17 (for example, a thermistor) for detecting the temperature of the chargeable battery 16 is mounted adjacent to the chargeable battery 16, and connected to a terminal 11D of the charging controller 11 through a terminal 19B. A temperature change Δt of the chargeable battery 16 is detected by the battery temperature sensor 17.

A power source supplied from the ac plug 1 is reduced to a specified voltage level by the transformer 2, and becomes a regulated dc power source through the diode 3 and the capacitor 4 in the dc-dc converter 5. An output from the dc-dc converter 5 is supplied to the emitter of the transistor 7 and the emitter of the transistor 8. If a normal charging is required, a control signal CS1 is applied from the terminal 11A of the charging controller 11 to the base of the transistor 9 to turn on the transistor 9. This allows the transistor 7 to be turned on. A collector current of the transistor 7 is supplied to the chargeable battery 16 through the resistor 18 and a diode 14. Thus, the normal charging is made.

If a quick charging is required, then a control signal CS2 from the terminal 11B of the charging controller 11 is applied to the base of the transistor 10 to turn on the transistor 10. This allows the transistor 8 to be turned on. A collector current of the transistor 8 is supplied through the diode 14 to the chargeable battery 16.

The operations of the charging controller 11 after the chargeable battery has been fully charged by the quick charging are described below. Whether the chargeable battery 16 has already been fully charged or not is determined by a signal supplied from a junction point between the resistors 13 and 15 connected to the terminal 11C of the charging controller 11, a signal supplied from the battery temperature sensor 17 to the terminal 11D of the charging controller 11, and a charging timer provided in the charging controller 11. Moreover, in addition to the charging timer, the charging controller 11 contains an input signal processing circuit, a data processing and memory circuit, and the like (not shown). The charging controller 11 is preferably constituted by a one-chip microcomputer.

In the input signal processing circuit, information on the charging timer, and information on voltage value and battery temperature supplied in analog values are converted to digital values. A digital output signal from the input signal processing circuit is supplied to the data processing and memory circuit. In the data processing and memory circuit, based on such a digital signal, the pulse width and its cycle of a current output from the terminal 11B of the charging controller 11 are calculated and stored. When self-discharging occurs after the chargeable battery 16 has been fully charged, then a pulse control signal CS2 is supplied from the terminal 11B in a predetermined cycle. Thus, the transistor 10 is periodically turned on to ensure the full-charging state. In this case, since the charging is made intermittently, the degradation of characteristics of the chargeable battery can be prevented.

The calculation of the pulse width is carried out based on characteristic data of the chargeable battery stored in the data processing and memory circuit of the charging controller 11 (refer to FIG. 5). The capacity of a chargeable battery having characteristic data as shown in FIG. 5 is given as 1000 mAh and the voltage thereof is 6 V. According to characteristic data of the chargeable battery, the monthly self-discharging is found as 300 mAh. The amount of the battery self-discharging per hour is calculated from the result as follows:

$$\text{Discharging amount} = 300 \text{ mAh}/(30 \times 24)$$
$$= 0.416 \text{ mAh}$$

Moreover, assuming that the charging current is at 40 mA, the charging time, that is, the pulse width per hour is determined as follows:

$$\text{Charging time} = 0.416 \text{ mAh}/40 \text{ mA}$$
$$= 37.44 \text{ sec.}$$

From this calculation, the pulse width of the control signal CS2 supplied from the terminal 11B after the full-charging is determined as 37.44 sec., per hour. The value of the pulse current supplied to the chargeable battery at this time is equivalent to that in the quick charging. The pulse width may not be found as 37.44 sec. but, for example, some 40 to 50 sec.

FIG. 6 shows a circuit block diagram of a battery charging apparatus according to a second embodiment of the invention. In FIG. 6, an ac plug 21 is connected to a primary winding of a transformer 22. A diode 23 is connected at one end to a secondary winding of the transformer 22. The other end of the diode 23 is connected to one end of a capacitor 24 and a terminal 25A of a dc-dc converter 25. In addition, a terminal 25C of the dc-dc converter 25 is grounded, and a terminal 25B is also connected to one end of a capacitor 26. The other end of the secondary winding of the transformer 22 is connected to the other end of the capacitor 24 and the other end of the capacitor 26.

In addition, one end of the capacitor 26 is connected to an emitter of a transistor 27, one end of a bias resistor 28 and a terminal 29A of a dc regulator 29, and grounded through a capacitor 26A. A base of the transistor 27 is connected to the other end of the bias resistor 28 and a terminal 30B of a charging controller 30. Moreover, a terminal 29B of the dc regulator 29 is connected to a terminal 30A of the charging controller 30, and grounded through a capacitor 36. A terminal 29C of the dc regulator 29 is grounded. A collector of the transistor 27 is connected to one end of a diode 31 and one end of a resistor 32. The other end of the resistor 32 is connected to one end of a resistor 33 and a terminal 30C of the charging controller 30. The other end of the resistor 33 is grounded. The resistor 32 and the resistor 33 are used as resistors for the voltage detection of a chargeable battery 34 which will be explained later. That is, a change of a charging voltage ΔV from the time at which the chargeable battery 34 is fully charged to the time at which discharging starts, is detected by the resistors 32 and 33.

The other end of the diode 31 is connected to a positive side of the chargeable battery 34 through a terminal 37A. A negative side of the chargeable battery 34 is grounded through a terminal 37C. A battery temperature sensor 35, for example, a thermistor to detect the temperature of the chargeable battery 34, is mounted adjacent to the chargeable battery 34, and connected to a terminal 30D of the charging controller 30 through a terminal 37B. A temperature change Δt of the chargeable battery 34 is detected by the battery temperature sensor 35.

A power source supplied from the ac plug 21 is reduced to a specified voltage by the transformer 22, and becomes a stabilized power source through the diode 23 and the capacitor 24 in the dc-dc converter 25. An output signal from the dc-dc converter 25 is applied to the emitter of the transistor 27 and the dc regulator 29. When normal charging is required, then a control signal for the normal charging from the terminal 30B of the charging controller 30 is applied to the base of the transistor 27. This allows the transistor 27 to be turned on. A collector current in the transistor 27 is supplied through the diode 31 to the chargeable battery 34.

When a quick charging is required, then a control signal for the quick charging from the terminal 30B of the charging controller 30 is applied to the base of the transistor 27. The chargeable battery 34 is therefore charged in the same way as mentioned above. In this case, the amount of the charging current is shown in FIG. 7A.

The operation of the charging controller 30 after the chargeable battery 34 has been fully charged is described below. Whether the chargeable battery 34 has already been fully charged or not is determined by a signal supplied from junction points of the resistors 32 and 33 to the terminal 30C of the charging controller 30, a signal supplied from the battery temperature sensor 35 to the terminal 30D of the charging controller 30, and a charging timer provided in the charging controller 30. In addition, this charging to compensate for any self-discharge is made with the same current as that in the quick charging. More specifically, this charging comprises a pulse having a current value in a range of ⅒th to ⅟₅₀th of that in the full-charging (refer to FIG. 7B). Moreover, in addition to the charging timer, an input signal processing circuit and a data processing and memory circuit and the like (not shown) are additionally provided in the charging controller 11.

In the input signal processing circuit, information on the charging timer and information on the voltage value and battery temperature supplied at analog values are converted to digital values. A digital output signal from the input signal processing circuit is supplied to the data processing and memory circuit. In the data processing and memory circuit, based on such a digital signal, the pulse width of a current output from the terminal 30B of the charging controller 30 is calculated and stored.

In the battery charging apparatus, the quick charging and normal charging circuits are united into one to switch over the quick charging and normal charging by means of a control signal supplied from the charging controller 30. This results in a miniaturized battery charging apparatus and the like.

FIG. 8 shows a flowchart of operations in a quick charging for the charging controller 30 to control the charging. As shown in FIG. 8, when a quick charging is performed on the chargeable battery (step 41), whether the chargeable battery 34 is fully charged or not is determined by a signal input from the terminals 30C and 30D of the charging controller 30 (step 42).

After the full-charging, the transistor 27 is turned off (step 43), and at this time a charging timer in the charging controller 30 is set to on (step 44). The on time data of the charging timer is stored in the data processing and memory circuit, and in the step 44 is practically used to control the off time of the transistor 27.

If in the step 45 the expiration of a specified time preset for the charging timer is confirmed, a pulse control signal is supplied to the transistor 27 to turn on the transistor 27 (step 46). This allows the chargeable battery 34 to be charged to compensate for a self-discharge. When the transistor 27 is turned on, the charging timer is activated (step 47) and the charging time for the chargeable battery 34 is set. In this case, the setting value of the charging time is stored in the data processing and memory circuit in the same way as mentioned above. If it is found in the step 48 that a specified time preset to the charging timer has passed, the control is returned to the step 43 to turn off the transistor 27.

Incidentally, the existing battery charging apparatus may be provided with charging modes by means of, in addition to a quick charging and a normal charging, an initial charging with a current flowing so as to check if a chargeable battery is normal, a supplementary charging with, for example, current to enable the full-charging of a chargeable battery of a nickel-hydrogen type or a trickle charging. In such battery charging apparatuses, as many changing circuits are constructed as the number of the charging modes. In this regard, it is recommended that the battery charging apparatus should be still more miniaturized.

FIG. 9 shows a battery charging apparatus according to a third embodiment of the invention constructed to taking account of the battery conditions. It is assumed here that a chargeable battery consisting of a nickel-hydrogen type shall be charged. In FIG. 9, an ac power of 100 V is supplied through an ac plug (not shown) to a charging power source 51. Initial charging current from the charging power source 51 is supplied to a chargeable battery 67. That is, an output of 5 V and 1000 mA is obtained. An emitter of a transistor 52 is connected to the charging power source 51, and a charging controller 53 is also connected thereto. A constant current from the charging power source 51 is supplied to the transistor 52. A base of the transistor 52 is connected through a resistor 54 to the charging controller 53. A collector of the transistor 52 is connected to a terminal 57 through a junction point 55 where one end of a resistor 63 is connected thereto, and a diode 56.

The charging controller 53 which is supplied with a constant voltage of 5 V from the charging power source 51 is connected to a terminal 58 and a terminal 59. In the terminal 59, the capacity of a chargeable battery 67 connected there is detected. Namely, assuming that the chargeable battery 67 having a capacity of 1000 mA is connected, the terminal 59 is connected to the (−) side of the chargeable battery 67 and shortcircuited. On the other hand, if the chargeable battery 67 with a capacity of 600 mA is connected, then the terminal 59 is not connected anywhere but placed in an open state. The charging controller 53 is connected to a switch part 60 to detect whether a chargeable battery 67 has been connected or not. Moreover, the charging controller 53 is connected both to one end of a resistor 61 and one end of a capacitor 62. The charging control is made possible at a voltage of ΔV, by supplying to the charging controller the voltage of drop due to the resistor 61. One end of the resistor 61 is connected to the other end of the resistor 63. In addition, a terminal 64, a fixed terminal of the switch part 60, the other end of the resistor 61, the other end of the capacitor 61 and the charging controller 53 are connected to the charging power source 51 and grounded. A portion 65 shown with dashed lines in FIG. 9 corresponds to the chargeable battery 67 to be pack.

The terminal 57 is connected to the (+) terminal of the chargeable battery 67. A battery temperature sensor 66 (for example, consisting of a thermistor) to detect the temperature of the chargeable battery 67 is connected to a (−) terminal of the chargeable battery 67, and the battery temperature sensor 66 is connected to a terminal 58. In addition, the (−) terminal of the chargeable battery 67 is connected to the terminal 59 and the terminal 64.

The operation of the battery charging apparatus as shown in FIG. 9 is described below. If the switch part 60 detects that a chargeable battery pack 65 has been connected, then its detection signal is supplied to the charging controller 53. In addition, the capacity of the connected chargeable battery 67 is detected depending on whether the terminal 59 is open or shortcircuited, and its detection signal is supplied to the charging controller 53. This causes a control signal from the charging controller 53 to be supplied through the resistor 54 to the transistor 52, and thereby the transistor 52 is turned on. Initial charging current is supplied to the chargeable battery 67 to check if the chargeable battery 67 normally operates. Next, the chargeable battery 67 is quickly charged by a 1000 mA constant current to be supplied from the charging power source 51. After that, a supplementary charging is carried out to fully charge the chargeable battery 67. If discharging of the chargeable battery 67 begins, then the trickle charging is started.

The temperature of the chargeable battery 67 is detected by the battery temperature sensor 66, and then the detected value is supplied to the charging controller 53. In addition, the resistors 61 and 63 detect whether or not the chargeable battery 67 has been charged. Namely, the fully charged battery starts self-discharging. The resistors 61 and 63 detect a change ΔV in the charging voltage at that time. The charging controller 53 behaves just like the charging controllers 11 and 30 as shown in FIG. 4 and FIG. 6. This causes a charging mode selected for the chargeable battery 67 to be switched over.

Incidentally, the battery temperature sensor is provided in the aforementioned first, second and third embodiments, so as to enable the detection of a temperature change Δt of the chargeable battery 67. Therefore, if a weakly charged nickel-hydrogen battery is connected which has been quick-charged just before full-charging, thereafter a control signal from the battery temperature sensor is supplied to the charging controller for and switched over to the supplementary charging. Therefore, even when the chargeable battery of nickel hydrogen type should be charged, charging can be suitably made. Since a nickel-hydrogen battery is as a practical matter hard to discharge, the trickle charging may not be carried out.

In addition, a resistor for the voltage detection is provided for the detection of a voltage change ΔV of the chargeable battery. Therefore, even if a nickel-cadmium battery is connected, it can be suitably charged. In the aforementioned first, second and third embodiments, a voltage change ΔV and a battery temperature change Δt, etc. are supplied to the charging controller 53 in order to switch over the charging mode. However for example, if a nickel-cadmium battery is connected, only the voltage change ΔV may be supplied to the charging controller 53, while if a nickel-hydrogen battery is connected, only the temperature change Δt may be supplied thereto.

FIG. 10 shows a waveform diagram of charging current, for example, in case that a nickel-hydrogen battery is charged by the battery charging apparatus as shown in FIG. 9. If the chargeable battery is connected, then charging current with a period T1 is supplied to the chargeable battery for an initial charging. In the state of a quick charging, current as shown for the period T2 is supplied to the chargeable battery. Charging current to be supplied to the chargeable battery is switched over to the supplementary charging as shown in the period T3 just before its capacity is fully charged. This supplementary charging allows the capacity of the chargeable battery to be fully charged. After the full-charging, if the discharging begins to occur, then a trickle charging as shown in the period T4 is started. As seen in FIG. 10, the amplitude of charging current is constant without regard to the charging mode, and the charging mode is switched over by changing the pulse width.

Now, assuming that the capacities of chargeable batteries to be charged by the battery charging apparatus are set to 1000 mA (for the battery A) and 600 mA (for the battery B), the charging current for each battery is given as follows:

|  | Initial Charging | Quick Charging | Supplementary Charging | Trickle Charging |
|---|---|---|---|---|
| Battery A | 150 mA | 1000 mA | 100 mA | 10 mA |
| Battery B | 90 mA | 600 mA | 60 mA | 6 mA |

Therefore, in case of the charging using a charging current value of up to 1000 mA, the duty ratio of a pulse of a charging current is given as follows:

|  | Initial Charging | Quick Charging | Supplementary Charging | Trickle Charging |
|---|---|---|---|---|
| Battery A | 15% | 100% | 10% | 1% |
| Battery B | 9% | 60% | 6% | 0.6% |

In case of the charging cycle T of 1000 sec., the is given as follows: charging time corresponding to a pulse width

|  | Initial Charging | | Quick Charging | | Supplementary Charging | | Trickle Charging | |
|---|---|---|---|---|---|---|---|---|
|  | on | off | on | off | on | off | on | off |
| Battery A | 150 | 850 | 1000 | 0 | 100 | 900 | 10 | 990 |
| Battery B | 90 | 910 | 600 | 400 | 60 | 940 | 6 | 994 |

(In seconds)

In addition, in case of the charging cycle T of 166.7 sec. (=1000 sec./6), the charging time corresponding to a pulse width is given as follows:

|  | Initial Charging | | Quick Charging | | Supplementary Charging | | Trickle Charging | |
|---|---|---|---|---|---|---|---|---|
|  | on | off | on | off | on | off | on | off |
| Battery A | 25 | 141.7 | 166.7 | 0.0 | 16.7 | 150.0 | 1.67 | 165.0 |
| Battery B | 15 | 151.7 | 100.0 | 66.7 | 10.0 | 156.7 | 1.00 | 165.5 |

(In seconds)

As seen from times in case of the charging cycle T=166.7 sec., the minimum charging time is set at 1.0 sec. (refer to the trickle charging of Battery B).

Having described specific preferred embodiments of the present invention with reference to the accompanying drawings, it is to be understood that the invention is not limited to those precise embodiments, and that various changes and modifications may be effected therein by one skilled in the art without departing from the scope or the spirit of the invention as defined in the appended claims.

According to the invention, the miniaturization of a circuit scale can be realized by uniting multiple circuits required for multiple charging modes into one circuit by use of a charging controller. In addition to this, even if an IC is used in the control block, the number of used pins of the IC can be decreased, and therefore the function of IC itself is not restricted. In addition, a battery temperature sensor is provided for the chargeable battery of a nickel-hydrogen type, etc. which is weak for over-charging, and a pulse supplementary charging is carried out corresponding to its detected output, so that full-charging can be achieved without degrading the battery characteristics. Therefore, the battery capacity of a chargeable battery can be maintained over a long period. On the other hand, for a chargeable battery of a nickel-cadmium type, a means is for the voltage detection is provided, whereby charging after the discharging can be made. Moreover, since the charging is intermittently repeated, it is possible to prevent the characteristics of the chargeable battery from being degraded.

What is claimed is:

1. A battery charging apparatus for charging a chargeable battery, comprising:

a dc power source for generating a charging current;

current control means connected between said dc power source and a chargeable battery to be charged;

charging controller means connected to said current control means for controlling a flow of said charging current from said dc power source to said chargeable battery, and for supplying a pulse train of control pulses to said current control means for supplying said charging current to said chargeable battery corresponding to a change in self-discharge after a completion of charging of said battery; and charging condition detecting means for detecting when said chargeable battery is fully charged and when said chargeable battery starts discharging at a self-discharge rate;

wherein said charging controller means supplies said control pulse train to said current control means and the pulse width and the interval between the control pluses of said pulse train are selected by said charging controller means based at least upon the rate of self-discharge of said chargeable battery such that said chargeable battery receives pulses of said charging current corresponding to said control pulse train which are sufficient to affect said self-discharging.

2. A battery charging apparatus as cited in claim 1, wherein said charging controller means operates in a plurality of charging modes which are determined by a pulse width and an interval of said control pulse to be supplied to said current control means, wherein said pulses of charging current supplied to said chargeable battery have substantially the same amplitude in each of said plurality of charging modes.

3. A battery charging apparatus as cited in claim 2, wherein said plural modes includes a quick charging mode, and a trickle charging mode responsive to discharging of a charged battery.

4. A battery charging apparatus as cited in claim 3, wherein said modes further include an initial charging and a supplemental charging.

5. A battery charging apparatus as cited in claim 1, wherein said current control means includes a first current controller to be used during a quick charge mode and second current controller to be used during a trickle charge mode.

6. A battery charging apparatus as cited in claim 5, wherein said charging current to said chargeable battery by said second current controller is in a range of about 1/10th to about 1/50th of the charging current to said chargeable battery by said first current controller.

7. A battery charging apparatus as cited in claim 1, wherein said charging condition detecting means includes battery voltage detecting means for detecting battery voltage and battery temperature detecting means for detecting battery temperature.

8. A battery charging apparatus as cited in claim 1, wherein said charging controller means includes a charging timer which determines charging time after said rechargeable battery has fully charged.

9. A battery charging apparatus as cited in claim 1, wherein said pulse width is calculated based on characteristic data of said chargeable battery stored in said charging controller means.

10. A battery charging apparatus for charging a chargeable battery, comprising:

means for charging a chargeable battery in at least one of a plurality of charging modes, including a normal charging mode, a quick charging mode, and a discharging responsive mode, said charging means including a dc power source for generating a charging current;

charging condition detecting means for detecting whether said chargeable battery is fully charged and whether said chargeable battery has begun to self-discharge;

charging controller means connected to said charging means and responsive to said charging condition detecting means for supplying a pulse to said charging means having a predetermined pulse width and interval according to at least one of said modes of charging, said pulse width and interval being related to a rate of discharge characteristic of said chargeable battery when said charging means is operating in said discharging responsive mode.

11. A battery charging apparatus as set forth in claim 10, wherein said charging condition detecting means further detects a temperature of said chargeable battery and provides a signal representative of said battery temperature to said charging controller means.

12. A battery charging apparatus as set forth in claim 10 wherein said charging condition detecting means include passive elements for determining when said chargeable battery has begun to discharge by detecting a change of a charging voltage between a time at which the battery is fully charged and a time at which discharge starts.

13. A battery charging apparatus as set forth in claim 12, wherein said charging controller means further includes a timing means for controlling a duration of application of said pulse.

14. A battery charging apparatus as set forth in claim 10 wherein said pulse is intermittently supplied to said chargeable battery when said means for charging operates in said discharging mode.

15. A battery charging apparatus as set forth in claim 10, wherein said pulse width is calculated based on characteristic data of said chargeable battery stored in said charging controller means.

16. A battery charging apparatus for charging a chargeable battery, comprising:

means for charging a chargeable battery in at least one of a plurality of charging modes, including a normal charging mode, a quick charging mode, and a discharging responsive mode, said charging means including a dc power source for generating s charging current;

charging condition detecting means for detecting whether said chargeable battery is fully charged and whether said chargeable battery has begun to self-discharge;

charging controller means connected to said charging means and responsive to said charging condition detecting means for supplying a pulse to said charging means having a predetermined pulse width and interval according to at least one of said modes of charging, said pulse width and interval being related to a rate of discharge characteristic of said chargeable battery when said charging means is operating in said discharging responsive mode;

wherein said charging condition detecting means include passive elements for determining when said chargeable battery has begun to discharge by detecting a change of a charging voltage between a time at which the battery is fully charged and a time at which discharge starts;

wherein said pulse width is calculated based on characteristic data of said chargeable battery stored in said charging controller means.

\* \* \* \* \*